United States Patent
Lynch

(10) Patent No.: US 8,115,523 B2
(45) Date of Patent: Feb. 14, 2012

(54) CIRCUIT TO SPREAD THE SPECTRUM OF A PWM SIGNAL

(75) Inventor: Brian Thomas Lynch, Brookline, NH (US)

(73) Assignee: Texas Instruments Incorporated, Dallas, TX (US)

( * ) Notice: Subject to any disclaimer, the term of this patent is extended or adjusted under 35 U.S.C. 154(b) by 538 days.

(21) Appl. No.: 12/333,906

(22) Filed: Dec. 12, 2008

(65) Prior Publication Data
US 2010/0148732 A1    Jun. 17, 2010

(51) Int. Cl.
*H03K 4/06* (2006.01)
(52) U.S. Cl. .................. 327/131; 327/137; 327/140
(58) Field of Classification Search .............. 327/131, 327/132, 134, 135, 137, 140
See application file for complete search history.

(56) References Cited

U.S. PATENT DOCUMENTS

| | | | |
|---|---|---|---|
| 7,030,594 B2 * | 4/2006 | Lee et al. ............... | 323/266 |
| 7,256,623 B2 * | 8/2007 | Day et al. .............. | 327/101 |
| 7,388,413 B1 * | 6/2008 | Ball ....................... | 327/131 |
| 7,642,820 B2 * | 1/2010 | Chen et al. ............. | 327/131 |
| 7,746,130 B2 * | 6/2010 | Chang .................... | 327/131 |

* cited by examiner

*Primary Examiner* — Hai L Nguyen
(74) *Attorney, Agent, or Firm* — John J. Patti; Wade J. Brady, III; Frederick J. Telecky, Jr

(57) ABSTRACT

An apparatus is provided. The apparatus comprises a first current source and a second current source that charge and discharge a capacitor. Coupled between the capacitor and the second current source is a switch that can be actuated and deactuated by a controller. Preferably, the controller is coupled to the capacitor and receives a first threshold voltage and a second threshold voltage so that it can actuate the switch if the voltage across the capacitor is greater than the first threshold voltage and deactuate the switch if the voltage across the capacitor is less than the second threshold voltage. Additionally, there is a comparator that is coupled to the capacitor that compares the voltage across the capacitor to a reference voltage, and there is a a multiplexer that is coupled to the capacitor and that is coupled to the comparator. The multiplexer outputs the voltage across the capacitor if the voltage across the capacitor is greater than the reference voltage and outputs the reference voltage if the voltage across the capacitor is less than the reference voltage.

16 Claims, 7 Drawing Sheets

CIRCUIT TO SPREAD THE SPECTRUM OF A PWM SIGNAL

FIELD OF THE INVENTION

This invention relates generally to the fixed frequency clock oscillator used in pulse width modulation (PWM) control circuits of switching power supplies and DC to DC converters, and more specifically to the generation of a spreading signal used to modulate the frequency of the PWM output, thereby spreading its output spectrum.

BACKGROUND OF THE INVENTION

Switching power supplies are widely used in electronic systems because they are more efficient and typically smaller and lighter than dissipative supplies of comparable output power. One class of such switching power supplies uses a fixed-frequency clock oscillator, having a substantially fixed frequency output with variable duty cycle PWM, whereby the output pulse width is modulated dependent on input to output voltage differential and load current. An error voltage responsive to the difference between the desired output voltage or current and the actual output voltage or current is generated and coupled to the PWM, so as to modify its duty cycle at the frequency of the clock oscillator in a manner which minimizes this error voltage.

One drawback to switching supplies is the electrical noise generated at the frequency of the clock oscillator, sometimes referred to as radio frequency interference (RFI) or electromagnetic interference (EMI). The current through the switching element in such a supply is typically switched from substantially fully on to fully off at the frequency of the clock oscillator, creating large circulating currents in circuit traces. These large currents at the PWM frequency may then radiate as RFI or couple to other circuit traces through capacitive or magnetic coupling. Known techniques, such as proper circuit trace layout and shielding, may reduce this electrical noise at the clock frequency, but may not fully suppress the undesired interference, especially when the clock frequency falls within the operating frequency range of the circuit being powered. An example might be the use of a switching power supply with a clock frequency of 1 MHz in a television system. If even a small amount of 1 MHz signal couples into the analog video signal, it may be visible in the displayed image as faint but annoying diagonal lines in the image. By spreading the spectrum of the PWM signal, the subjective impairment of such interference is often significantly reduced.

Known circuits and methods exist for spreading the spectrum of the PWM signal, typically employing a spreading oscillator at a frequency substantially lower than the clock oscillator operating frequency. The output of this spreading oscillator is coupled to a node within the clock oscillator so as to cause the frequency of the clock oscillator to change, dependent on the instantaneous amplitude of the spreading oscillator output. The spreading oscillator typically uses the time constant of a resistor and a capacitor to set its operating frequency, or alternatively may use other circuits such as a digital waveform generator comprising a lookup table and digital to analog converter.

An apparatus and method for generating a spreading signal without the need for an additional frequency-determining capacitor is desirable, especially when the PWM controller is an integrated circuit. Such an additional capacitor is typically too large to be integrated, and typically requires another pin on the integrated circuit to support it. A spreading oscillator which utilizes a capacitor already used by the PWM controller for another function is therefore desirable, and is an object of the present invention.

SUMMARY OF THE INVENTION

The invention provides a method and apparatus for using a single capacitor in a switching power supply first as the timing element for the soft start circuit during the soft start time (also referred to herein as startup), then, after startup is complete, as the timing element for a spreading oscillator which modulates the frequency of the clock oscillator to provide spread spectrum operation. Additionally, the invention allows substantially independent control of the timing and frequency parameters of the startup timer and spreading oscillator functions, respectively.

In a preferred embodiment of the invention described in greater detail below, the voltage on the soft start capacitor (Capacitor 102) is applied to a comparator. During the startup time and while the voltage on Capacitor 102 is below the comparator threshold voltage, the capacitor is coupled to the soft start circuit. At the end of startup time, the voltage reaches or exceeds this threshold and the capacitor 102 is decoupled from the soft start circuit and is coupled to the spreading oscillator.

While the preferred embodiment described herein is used in a switching power supply, other applications may effectively utilize a single capacitor in both a timer and an oscillator, for example an oscillator having a delayed turn-on for use in an alarm.

Further benefits and advantages will become apparent to those skilled in the art to which the invention relates.

BRIEF DESCRIPTION OF THE DRAWINGS

Throughout the drawings, like elements are referred to by like numerals.

DETAILED DESCRIPTION

Figure 1:
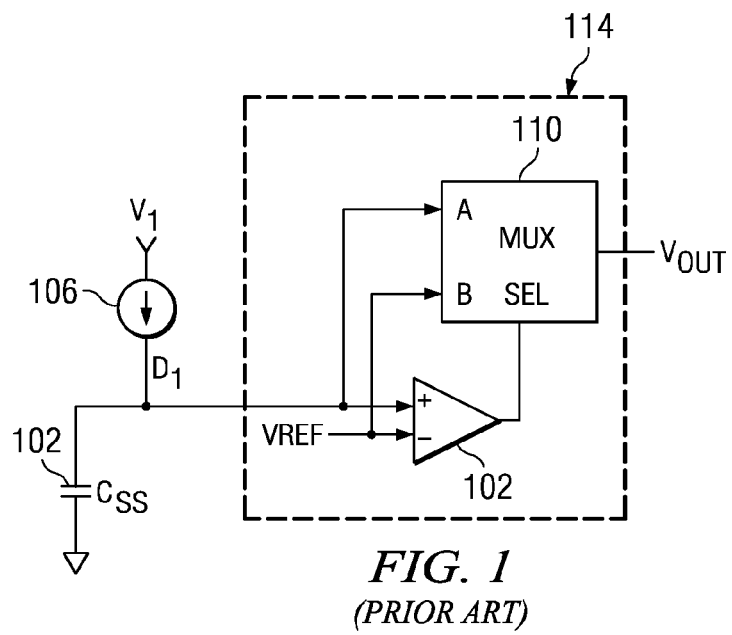
FIG. 1 (prior art) is a block diagram of a soft start circuit as used in a switching power supply.

In FIG. 1, a block diagram is shown of a known soft-start circuit for a PWM controller used in a switching power supply. A current source 106 has a first terminal coupled to voltage V1 and a second terminal coupled to a first terminal of a capacitor 102 and to a first non-inverting input terminal of comparator 108, and to a first input A terminal of multiplexer or MUX 110. Capacitor 102 has a second terminal coupled to ground. A voltage source operable to provide voltage VREF is coupled to the second inverting input terminal of comparator 108 and to a second input B terminal of MUX 110. The third output terminal of comparator 108 is coupled to the third select input terminal SEL of MUX 110. The output terminal of MUX 110 is coupled to output terminal VOUT. Comparator 108 and MUX 110 connected as described comprise circuit 114, operable to couple the smaller of voltages VREF or the voltage present on Capacitor 102 to the output terminal VOUT.

In operation, after a suitable period of time during which the circuitry is unpowered, capacitor 102 is discharged to near zero volts. When power is applied, beginning the startup process, current source 106 becomes active, and begins charging capacitor 102 with current I1. The rate of change of the voltage on capacitor 102 depends on the charging current from current source 106 and the capacitance value of capacitor 102, and so may be tailored to suit the application. During the initial portion of charging of capacitor 102, its voltage is below the reference voltage VREF, thus causing the output of comparator 108 to be in a low state. The resulting low state output of comparator 108, coupled to input SEL of MUX 110, causes MUX 110 to select the A input, coupling the voltage on capacitor 102 to the output terminal VOUT.

In a typical controller, this voltage VOUT is coupled to the PWM so as to cause the duty cycle of the PWM to be responsive to this voltage VOUT. Therefore, during the initial charge time of capacitor 102, this voltage V0 is rising from a low voltage, and the duty cycle of the PWM is rising from a low value toward its nominal operating value. Gradually increasing the PWM duty cycle in this manner, and therefore the output current of the switching supply, provides a more controlled startup of the supply.

When the voltage on capacitor 102 reaches voltage VREF, the output of comparator 108 changes state, causing MUX 110 to select input B, thus coupling voltage VREF to output terminal VOUT. After the soft start period, and as long as the voltage on capacitor 102 remains above voltage VREF, the output VOUT will be substantially equal to voltage VREF.

This circuit allows configuring by design the rate of charge for capacitor 102, and hence the rate of change of voltage on capacitor 102, by tailoring the amount of current sourced by current source 106 and/or the capacitance of capacitor 102. The rate of charge is also largely independent of the voltage V1, which may vary substantially due to the wide input voltage range typical of switching power supplies. The startup time, from voltage zero on capacitor 102 to output voltage VREF at VOUT, is set by the rate of change of voltage on capacitor 102 and the threshold voltage VREF. Decreasing the rate of change of voltage on capacitor 102, or increasing the voltage VREF, each cause a lengthening of the startup time. Once the startup phase is over, the voltage at terminal VOUT is substantially equal to the voltage at terminal VREF, and the PWM oscillator is at its nominal frequency, even if capacitor 102 continues to charge.

Those skilled in the art will recognize that the voltage on capacitor 102 may, in some applications, be level shifted, amplified and/or attenuated prior to being coupled to comparator 108 and MUX 110, and that in such cases, operation of the circuit is still substantially as described above.

Figure 2:
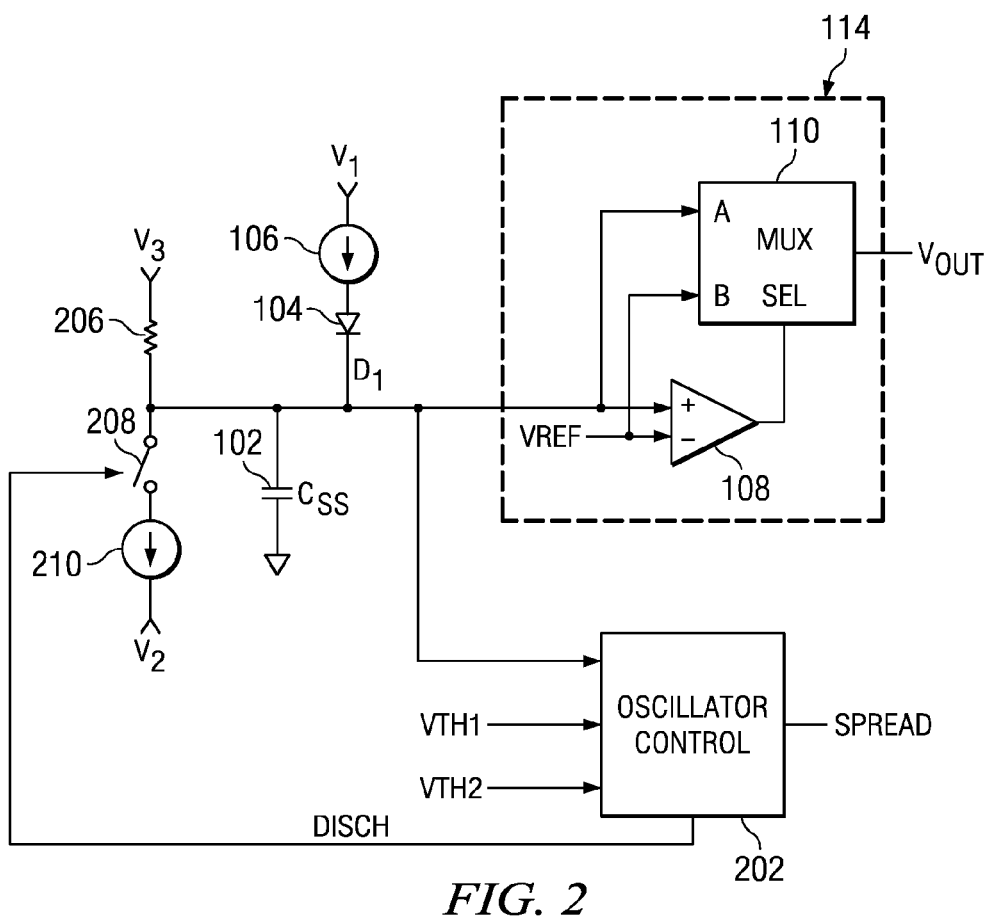
FIG. 2 is a block diagram of the circuit of FIG. 1 with additional circuitry creating an embodiment of the invention.

In FIG. 2, additional circuitry comprising Oscillator Control 202, voltage terminal V3, resistor 206, switch 208, current source 210, and voltage terminal V2 operate with the circuit elements described in FIG. 1 to provide an embodiment of the invention. Voltage V3 is coupled to a first terminal of resistor 206, which resistor has a second terminal coupled to a first terminal of switch 208, the first terminal of capacitor 102 (and thereby to the other circuit elements of FIG. 1 which are coupled to this first terminal of capacitor 102), and to a first input terminal of Oscillator Control 202. The second terminal of switch 208 is coupled to a first terminal of current source 210, and a second terminal of current source 210 is coupled to voltage terminal V2. Voltage VTH1, which is greater than voltage VREF, is coupled to a second terminal of Oscillator Control 202, and voltage VTH2, which is greater than voltage VREF but less than voltage VTH1, is coupled to a third terminal of Oscillator Control 202. A fourth output terminal DISCH of Oscillator Control 202 is coupled to a third control terminal of switch 208, and a fifth output terminal of Oscillator Control 202 is coupled to the spreading signal output terminal SPREAD 214.

In operation, during the soft start time when the voltage on capacitor 102 is less than the voltage VTH1, the state of signal DISCH causes switch 208 to be open, and the soft start circuit operates as described in FIG. 1, with the exception that the total charging current applied to capacitor 102 is increased somewhat by the current I3 flowing through resistor 206 from voltage V3. Typically, the value of this resistor 206 is large enough to cause only a modest change in charge rate for capacitor 102. Once the voltage on capacitor 102 exceeds voltage VREF, as described above, MUX 110 selects its B input, causing VOUT at terminal 116 to be coupled to and substantially equal to voltage VREF. The voltage on capacitor 102 continues increasing, and at approximately a voltage (V1−0.7V), diode D1 104 becomes reverse biased, stopping further charging of capacitor 102 by current source 106. Because of the high impedance of back-biased diode D1 104 and the typically high impedances presented by input A of MUX 110 and the first input of comparator 108, the capacitor 102 becomes effectively decoupled from the soft start circuitry and becomes available for use in another manner.

With the voltage on capacitor 102 above that voltage (V1−0.7V) and thus effectively decoupled from the soft start circuitry, current I3 through resistor 206 continues to charge capacitor 102 until its voltage just exceeds voltage VTH1, at which point Oscillator Control 202 changes its output DISCH coupled to switch 208 to a high state, closing this switch and beginning the discharge of capacitor 102 by current I2 from current source 210. Current source 210 is configured to provide a higher negative current I2 than the positive current I3 provided by resistor 206, thus insuring discharge of capacitor 102 with switch 208 closed. The voltage on capacitor 102 thus begins to decrease, continuing until it becomes just less than voltage VTH2, at which time the output DISCH of Oscillator Control 202 coupled to switch 208 changes to a low state, thereby opening switch 208 and causing the voltage on capacitor 102 to again rise.

The voltage on capacitor 102 thus periodically increases at a rate set substantially by V3, resistor 206, and capacitor 102, and then decreases at a rate substantially set by capacitor 102 and the difference in current between that flowing in resistor 206 and that flowing in current source 210. The amplitude of the periodic oscillation is substantially set by the voltages VTH1, which sets the upper bound of voltage excursion, and VTH2, which sets the lower bound. This periodic spreading signal is coupled from the first input of Oscillator Control 202 to the fifth output terminal of Oscillator Control 202, and is applied to the appropriate terminal in the PWM oscillator to cause the frequency of the PWM signal to vary in response to the periodic spreading signal.

Because voltages VTH2 and VTH1 are both above that voltage (V1−0.7V) at which D1 becomes reverse biased, the current source 106, which had substantially controlled the charge time of capacitor 102 during the startup time, is effectively decoupled from capacitor 102 during this periodic oscillation between voltages VTH2 and VTH1. Thus, the period of this oscillation is substantially controlled by the choice of capacitor 102, the charging current I3 through resistor 206, and the discharging current I2 provided by current source 210.

Those skilled in the art will recognize that the sense of comparator 108 inputs may be reversed if the inputs A and B of MUX 110 are similarly reversed. It is also obvious that current source 106 may be replaced with a resistor if the voltage V1 is substantially constant, and/or current source 210 may be replaced with a resistor if the voltage V2 is substantially constant. Replacing one or both of these current sources with a resistor will cause the charge and/or discharge of capacitor 102 to approximate an exponential function of time rather than the approximately linear function of time provided by the use of current sources, but overall operation of the embodiment will be similar to that described for FIG. 2. Resistor 206 may also be replaced with a current source, which would provide substantially linear rather than exponential charging of capacitor 102 during operation as an oscillator.

Those skilled in the art will also recognize alternatives to the use of diode D1 104 to control that voltage on capacitor 102 at which current source 106 stops charging. One such alternative is to set voltage V1 to that value which causes current source 106 to cut off at the desired capacitor 102 voltage. Another alternative is to replace diode D1 104 with a switch, controlled by the inverse of signal DISCH, which opens when the voltage on capacitor 102 reaches or exceeds voltage VTH2.

Figure 3:
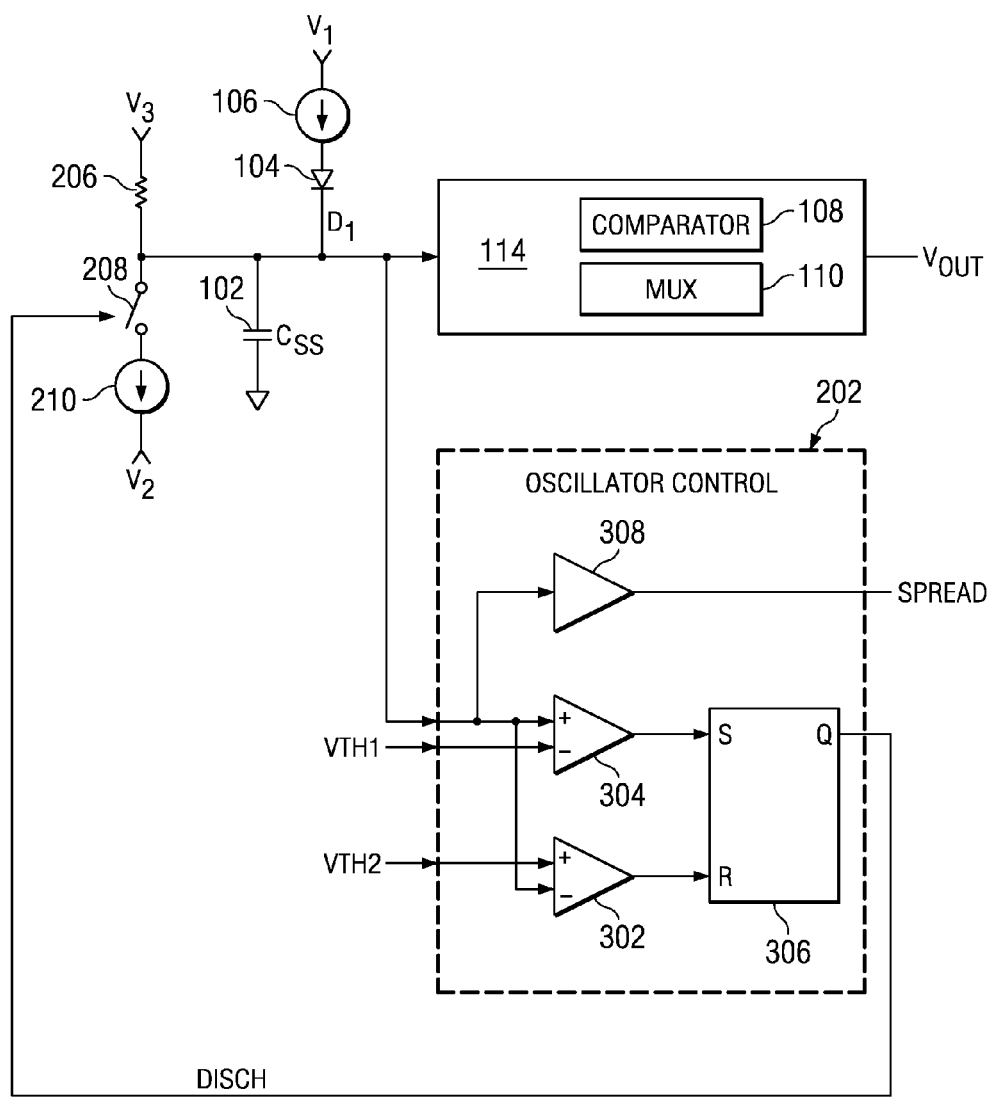
FIG. 3 is a block diagram of one embodiment of the Oscillator Control subcircuit of FIG. 2.

FIG. 3 is a block diagram showing one embodiment of the Oscillator Control 202 described above. The first terminal of capacitor 102 is coupled to a first input of Oscillator Control 202, which is coupled to a first inverting input terminal of comparator 302, a first non-inverting input terminal of comparator 304, and a first input terminal of buffer amplifier 308. Voltage VTH1 is coupled to a second input of Oscillator Control 202, which is coupled to a second inverting input terminal of comparator 304. Voltage VTH2 is coupled to a third input of Oscillator Control 202, which is coupled to a second non-inverting input terminal of comparator 302. A third output terminal of comparator 302 is coupled to a first reset input terminal R of set-reset flip-flop 306, and a third output terminal of comparator 304 is coupled to a second set input terminal S of set-reset flip-flop 306. The third output terminal Q of flip-flop 306 is coupled to output DISCH of Oscillator Control 202 and to the third control terminal of switch 208. The second output terminal of buffer amplifier 308 is coupled to the SPREAD 214 terminal and to a frequency determining spreading signal input terminal of the clock oscillator. Other circuit elements and connections are as described for FIG. 2.

In operation, during the soft start time when the voltage on capacitor 102 is less than the voltage VTH1, the state of signal DISCH causes switch 208 to be open, and the soft start circuit operates as described in FIG. 1, with the exception that the charging current applied to capacitor 102 is increased somewhat by the current flowing through resistor 206 from voltage V3. Typically, the value of this resistor 206 is large enough to cause only a modest change in charge rate for capacitor 102. Once the voltage on capacitor 102 exceeds voltage VREF, as described above, MUX 110 selects its B input, causing VOUT at terminal 116 to be coupled to and substantially equal to voltage VREF. Capacitor 102 continues charging, and when the voltage on capacitor 102 exceeds voltage VTH1 (VTH1>VTH2), a high logic state is generated at the output of comparator 304 which is applied to the set terminal S of flip flop 306. This causes the flip flop output Q to go high, creating a signal DISCH which is coupled to switch 208 and causes it to close, beginning the discharge of capacitor 102. When the voltage on capacitor 102, now decreasing because switch 208 is closed, becomes less than voltage VTH2, a high logic state is generated at the output of comparator 302, which is applied to the reset terminal R of flip flop 306. This causes its output Q to go low, opening switch 208 and causing the resumption of charging of capacitor 102.

Buffer amplifier 308 presents a high impedance to the voltage on capacitor 102, and generates a low-impedance output voltage substantially equal to the voltage on capacitor 102. This output signal from buffer 308 is coupled to the SPREAD 214 terminal, and is the spreading signal coupled to the spreading input of the PWM oscillator.

Figure 4:
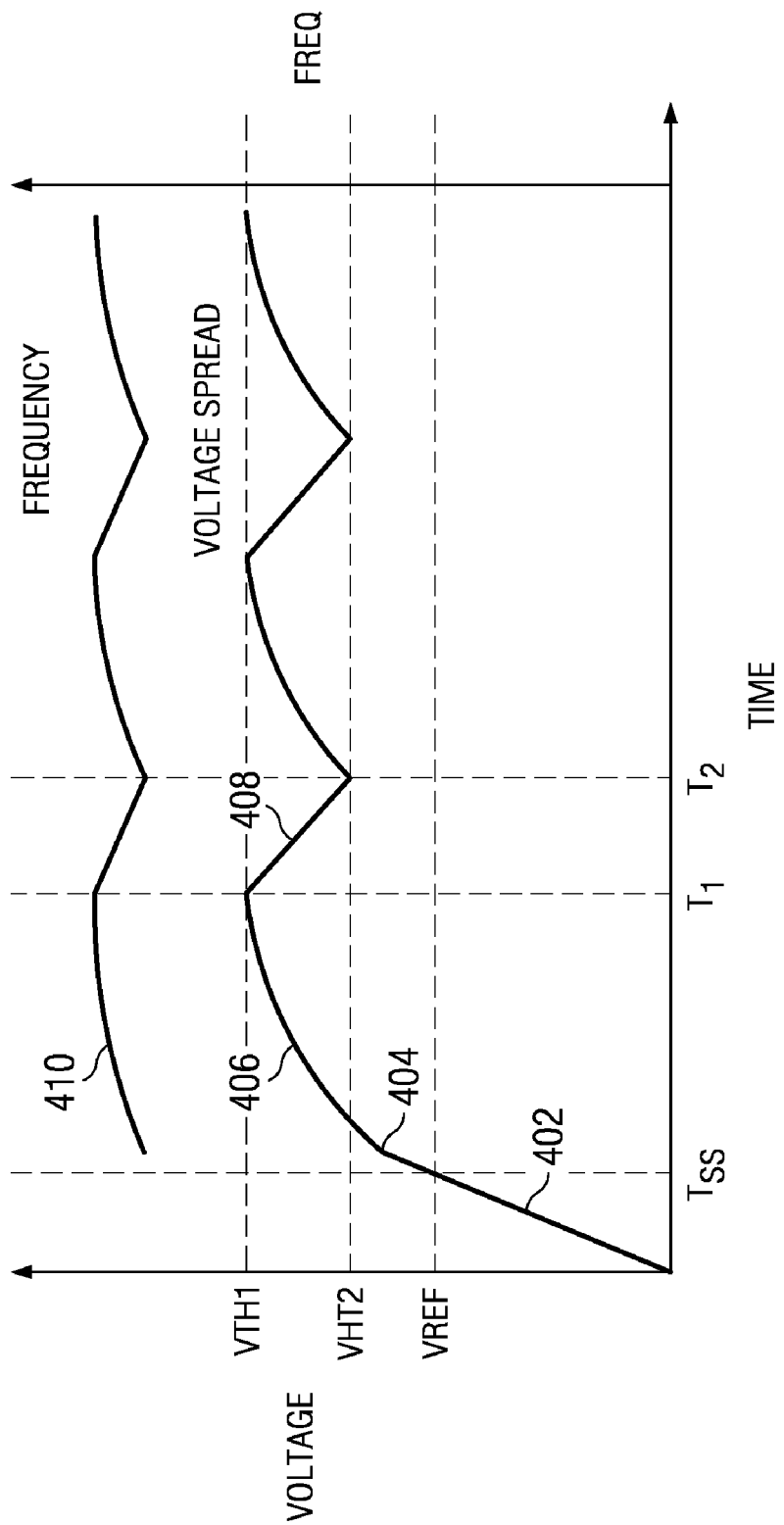
FIG. 4 is a graph of the voltage SPREAD and frequency of the spreading oscillator in an embodiment of the invention described in FIG. 2, showing the voltage SPREAD moving periodically between voltages VTH1 and VTH2 after the startup time Tss, and the frequency of the PWM oscillator when SPREAD is used a spreading signal for the PWM oscillator.

In FIG. 4, the spreading signal SPREAD is shown as function of time, as well as the output frequency versus time for the clock oscillator whose frequency is modulated by this spreading signal. At time zero, it is presumed that the soft start capacitor 102 is fully discharged. Upon application of power, the voltage SPREAD increases as capacitor 102 is charged by current source 106 and current through resistor 206, as shown by waveform segment 402. At time Tss, voltage SPREAD crosses the VREF threshold, signifying the end of the soft start period at time Tss. SPREAD then continues to increase due to continued charging of capacitor 102 by current source 106 and current through resistor 206, until it reaches a voltage at which diode D1 104 becomes non-conducting, shown as point 404 between VREF and VTH2. The voltage SPREAD continues increasing at a slower rate set now by the current through resistor 206 and shown as waveform segment 406. When SPREAD reaches voltage VTH1, switch 208 is closed, and the capacitor 102 is discharged by the difference between current source 210 and the current through resistor 206, causing SPREAD to decrease, as shown by waveform segment 408. On reaching voltage VTH2, switch 208 is opened and capacitor 102 begins charging again, causing SPREAD to again increase toward voltage VTH1. This oscillation between voltages VTH1 and VTH2 continues and provides the periodic spreading signal which is applied to the clock oscillator.

It is apparent that rate of increase for the voltage SPREAD is slower after point 404, since the current from current source 106 is no longer charging capacitor 102. The frequency of the resulting oscillation between voltages VTH1 and VTH2 is thus substantially independent of the soft start time Tss, even though the same capacitor 102 is used for both functions, thereby allowing the spreading signal frequency to be tailored as needed.

The frequency of this PWM oscillator, when modulated by the spreading signal SPREAD, is shown by the trace 410 labeled Frequency in FIG. 4. As would be expected, the frequency versus time graph has the same shape as the voltage SPREAD graph.

Figure 5:
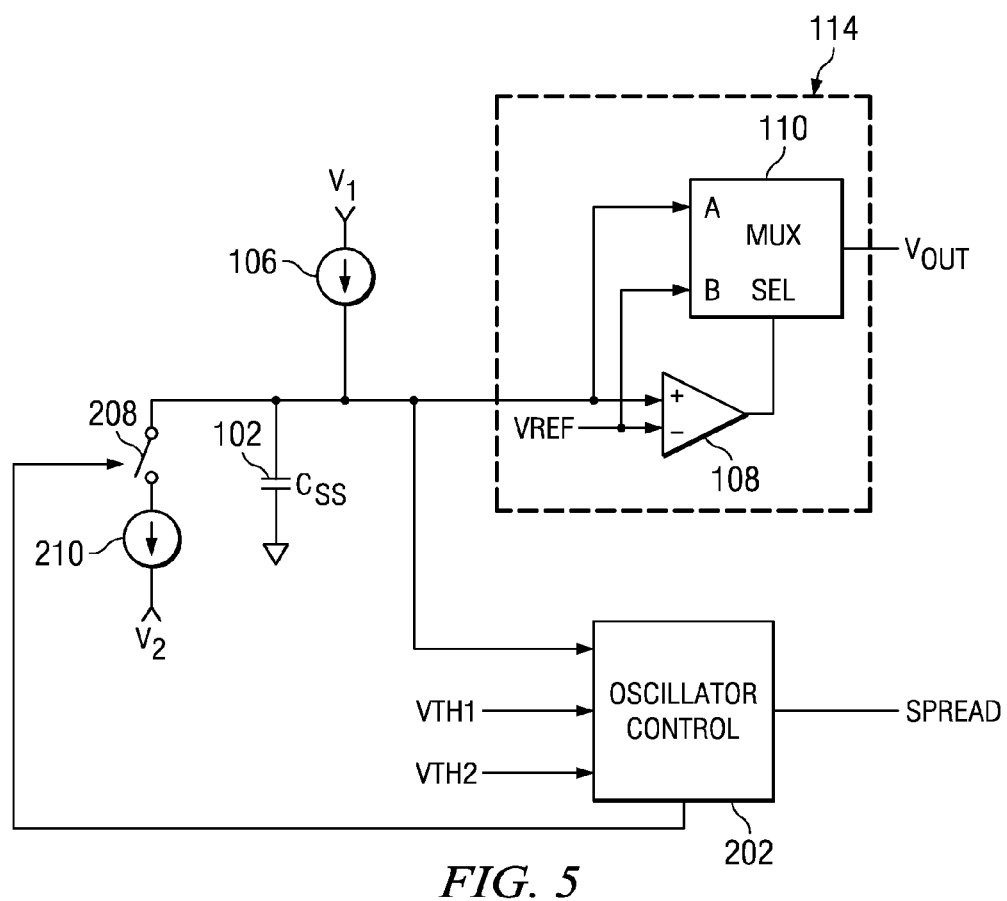
FIG. 5 is a block diagram of another embodiment of the invention, similar to that of FIG. 2 but utilizing a single charging current.

In FIG. 5, resistor 206, voltage source V3, and diode D1 104 are removed from the embodiment described in FIG. 2. Additionally, a direct coupling is made between current source 106 and capacitor 102. Other components and connections are the same as in FIG. 2.

In operation, during the soft start time when the voltage on capacitor 102 is less than the voltage VREF, circuit operation causes switch 208 to be open, and the soft start circuit operates as described in FIG. 1, with charging current T1 supplied by current source 106 to capacitor 102. Once the voltage on capacitor 102 exceeds voltage VREF, as described above, MUX 110 selects the B input, coupling voltage VREF to VOUT at terminal 116. The voltage at terminal VOUT is thus substantially equal to the voltage on capacitor 102 until that voltage reaches voltage VREF, after which the output voltage VOUT is substantially equal to voltage VREF even as the voltage on capacitor 102 continues to increase.

The voltage on capacitor 102 continues to rise due to the current I1 from current source 106, until it just exceeds voltage VTH1, at which point Oscillator Control 202 changes its output coupled to switch 208 to a high state, closing this switch and beginning the discharge of capacitor 102 by current I2 from current source 210. Current source 210 is configured to provide a higher negative current I2 than the positive current I1 provided by current source 106, thus insuring discharge of capacitor 102 with switch 208 closed. The voltage on capacitor 102 thus begins to decrease, continuing until it becomes just less than voltage VTH2, at which time the output of Oscillator Control 202 coupled to switch 208 changes to a low state, thereby opening switch 208 and causing the voltage on capacitor 102 to again rise.

The voltage on capacitor 102 thus periodically increases at a rate set substantially by current source 106 and the capacitance of capacitor 102, and then decreases at a rate substantially set by the capacitance of capacitor 102 and the difference in current between that flowing in current source 106 and that flowing in current source 210. The amplitude of the periodic oscillation is substantially set by the voltages VTH1, which sets the upper bound of voltage excursion, and voltage VTH2, which sets the lower bound. The output signal SPREAD from buffer 308 is coupled to the SPREAD 214 terminal, and is the spreading signal coupled to the spreading input of the clock oscillator. The embodiment of FIG. 5 is simpler than that of FIG. 2, but precludes independent control of charge rate of capacitor 102 during startup and after startup. In some applications, however, suitable startup time and frequency of the spreading oscillator may be achieved with this alternative embodiment.

Figure 6:
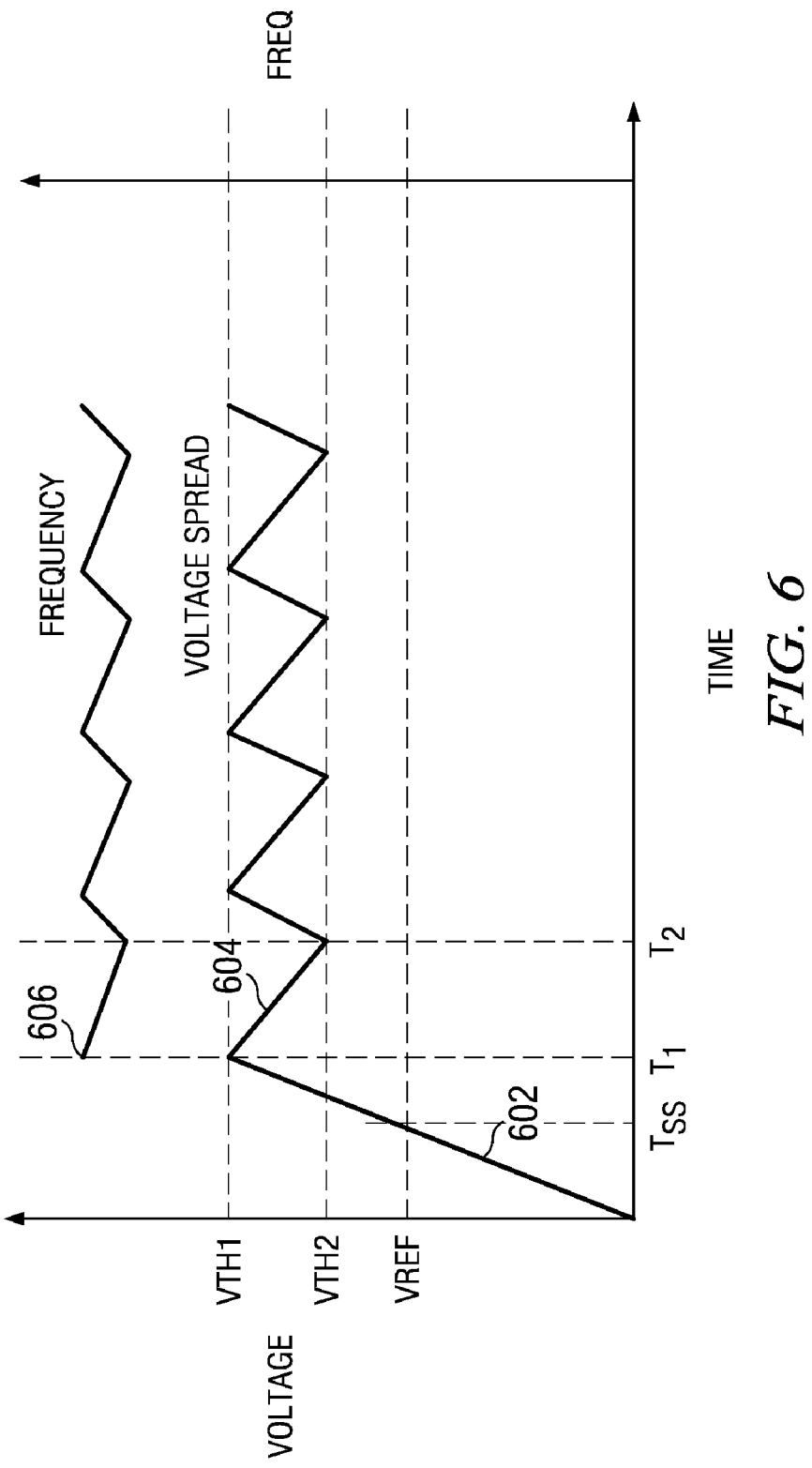
FIG. 6 is a graph of the voltage SPREAD and frequency of the spreading oscillator for the embodiment of the invention as described in FIG. 5, showing the voltage SPREAD moving periodically between voltages VTH1 and VTH2 after the startup time Tss, and the frequency of the PWM oscillator when SPREAD is used a spreading signal.

In FIG. 6, the spreading signal SPREAD generated by the embodiment of FIG. 5 is shown as function of time, as well as the output frequency versus time for the clock oscillator whose frequency is modulated by this spreading signal SPREAD. At time zero, it is again presumed that the soft start capacitor 102 is fully discharged. Upon application of power, switch 208 is open, and the voltage SPREAD increases as capacitor 102 is charged by current source 106, shown by waveform segment 602. At time Tss, signal SPREAD crosses the voltage VREF threshold, signifying the end of the soft start period at time Tss. SPREAD then continues to increase at substantially the same rate due to continued charging of capacitor 102 by current source 106. When the signal SPREAD reaches voltage VTH1, switch 208 is closed, and the capacitor 102 is discharged by the difference between the currents provided by current source 210 and current source 106, causing signal SPREAD to decrease as shown in waveform segment 604. It is apparent that the discharge current provided by current source 210 must exceed the charging current provided by current source 106 for discharge to occur. On reaching voltage VTH2, switch 208 is opened, and capacitor 102 begins charging again, causing signal SPREAD to again increase toward voltage VTH1. This oscillation between voltages VTH1 and VTH2 continues and provides the periodic spreading signal which is applied to the clock oscillator.

It is apparent to those skilled in the art that, in this embodiment, the rate of increase of voltage SPREAD is substantially constant during both the startup phase and oscillatory phase of operation, because only current source 106 charges capacitor 102 at all times, unlike the embodiment of FIG. 2. The rate of change of the rising edge of the signal SPREAD is thus typically designed to provide the desired startup time from time zero to time Tss. The rate of change of the falling edge of the signal SPREAD depends on the difference in currents in current source 106 and current source 210. Because current source 210 is active only during the oscillatory phase of operation, its current may be set as desired to control the rate of discharge between voltages VTH1 and VTH2, thereby providing a means to control the frequency of the resulting spreading signal.

The frequency of this clock oscillator, when modulated by the spreading signal SPREAD, is shown by the trace labeled Frequency in FIG. 6. As would be expected, the frequency versus time graph has the same shape as the voltage SPREAD graph.

Figure 7:
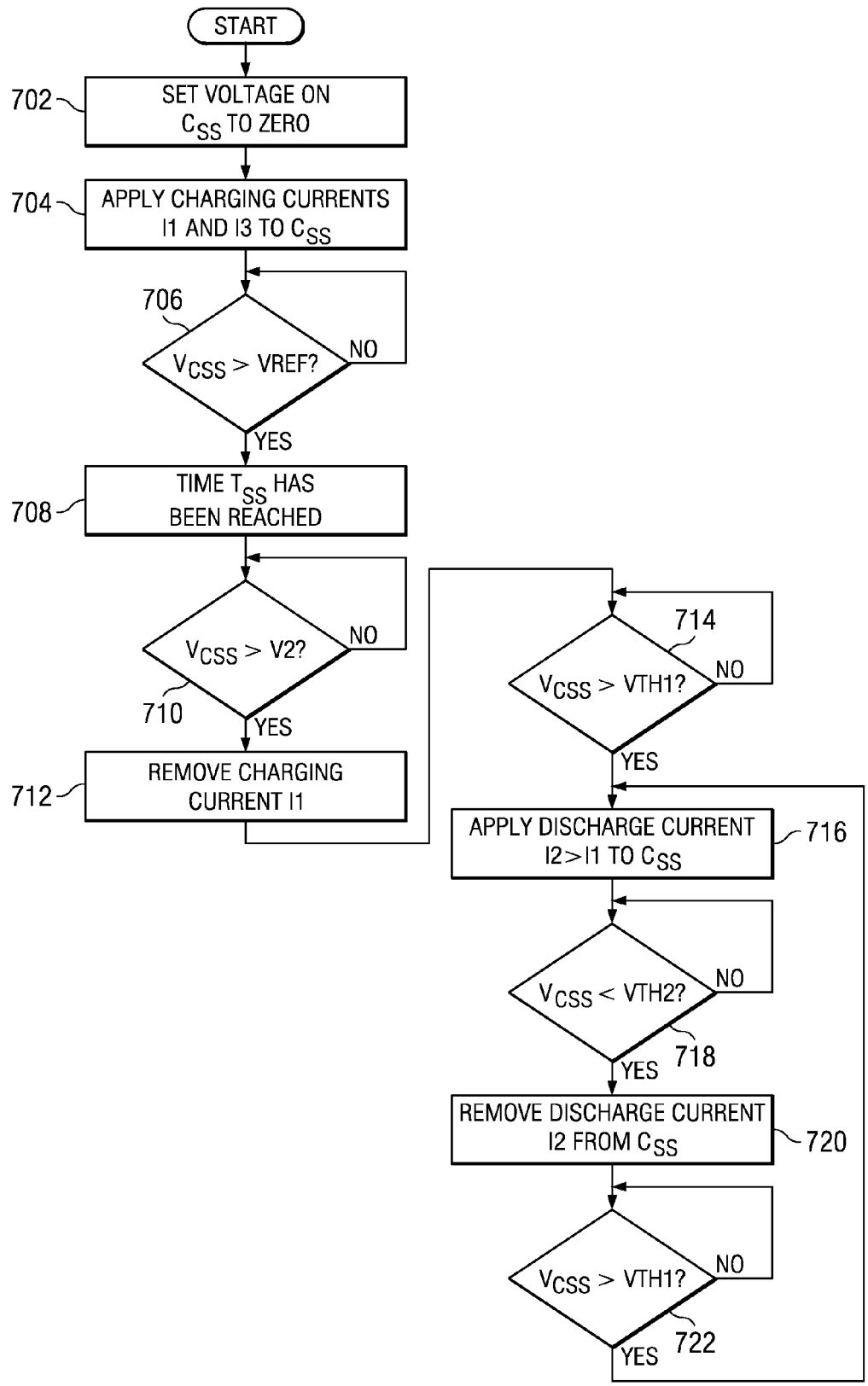
FIG. 7 is a flow chart of a method for utilizing a single capacitor as a timing element for two different functions, by decoupling it from the circuitry of the first function when the voltage on the capacitor exceeds a threshold value, and utilizing two differing charging currents to provide flexibility in setting time delay and oscillation period.

The flow chart of FIG. 7 details the operation of the embodiment of FIG. 2. The charge current I1 is that from current source 106; charge current I3 is that through resistor 206; discharge current I2 is that from current source 210.

At step 702, the capacitor 102 is discharged to zero volts.

At step 704, charging currents I1 and current I3 are applied to capacitor 102, and the voltage on capacitor 102 begins to rise.

At step 706, the voltage on capacitor 102 is tested to see if it is greater than voltage VREF. If not, it is again tested. If so, flow proceeds to step 708, indicative of time Tss having been reached.

At step 710, the voltage on capacitor 102 is tested to see if it is greater than voltage V2, which represents that voltage at which the diode D1 becomes substantially reverse biased. If not, it is again tested. If so, at step 712 the charging current I1 from current source 106 is removed. The capacitor 102 is now being charged by current I3 through resistor 206.

At step 714, the voltage on capacitor 102 is tested to see if it is greater than voltage VTH1. If not, it is again tested. If so, flow proceeds to step 716 and a discharge current I2, which is greater than current I3, is applied to capacitor 102, causing its voltage to begin to decrease.

At step 718, on capacitor 102 is tested to see if it less than voltage VTH2. If not, it is again tested. If so, flow proceeds to step 720 and the discharge current I2 is removed, causing the voltage on capacitor 102 to again increase.

At step 722, on capacitor 102 is tested to see if it is greater than voltage VTH1. If not, it is again tested. If so, flow proceeds to step 716, where the discharge current I2 is again applied, causing the voltage on capacitor 102 to again decrease, and beginning another cycle of the periodic waveform.

Figure 8:
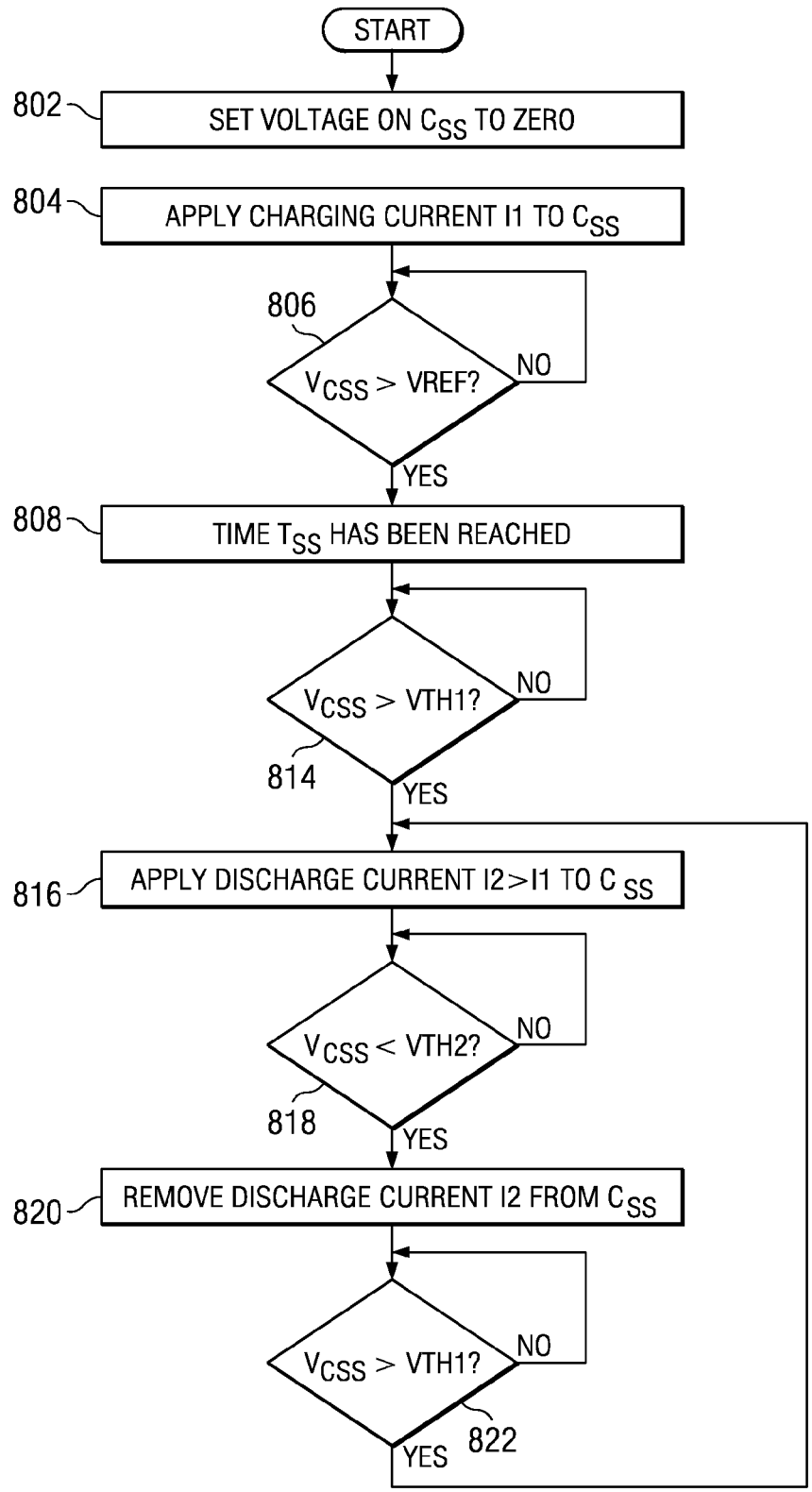
FIG. 8 is a flow chart of another method similar to that of FIG. 7, utilizing a single charging current.

The flow chart of FIG. 8 details the operation of the embodiment of FIG. 5. The charge current I1 is that from current source 106; discharge current I2 is that from current source 210.

At step 802, the capacitor 102 is discharged to zero volts.

At step 804, charging current I1 is applied to Capacitor 102, and the voltage on Capacitor 102 begins to rise.

At step 806, the voltage on capacitor 102 is tested to see if it is greater than voltage VREF. If not, it is again tested. If so, flow proceeds to step 808, indicative of time Tss having been reached.

At step 814, the voltage on capacitor 102 is tested to see if it is greater than voltage VTH1. If not, it is again tested. If so, flow proceeds to step 816 and a discharge current I2, which is greater than current I1, is applied to capacitor 102, causing its voltage to begin to decrease.

At step 818, the voltage on capacitor 102 is tested to see if it less than voltage VTH2. If not, it is again tested. If so, flow proceeds to step 820 and the discharge current I2 is removed, causing the voltage on capacitor 102 to again increase.

At step 822, the voltage on capacitor 102 is tested to see if it is greater than voltage VTH1. If not, it is again tested. If so, flow proceeds to step 816, where the discharge current I2 is again applied, causing the voltage on capacitor 102 to again decrease, and beginning another cycle of the periodic waveform.

Those skilled in the art to which the invention relates will also appreciate that yet other substitutions and modifications can be made to the described embodiments, without departing from the spirit and scope of the invention as described by the claims below.

What is claimed is:

1. An apparatus comprising:
   a first current source;
   a second current source;
   a switch that is coupled to the second current source;
   a capacitor that is coupled to the first current source and the switch;
   a comparator that is coupled to the capacitor, wherein the comparator compares the voltage across the capacitor to a reference voltage;
   a multiplexer that is coupled to the capacitor and that is coupled to the comparator, wherein the multiplexer outputs the voltage across the capacitor if the voltage across the capacitor is greater than the reference voltage and outputs the reference voltage if the voltage across the capacitor is less than the reference voltage; and
   a controller that is coupled to the capacitor and that receives a first threshold voltage and a second threshold voltage, wherein the controller actuates the switch if the voltage across the capacitor is greater than the first threshold voltage, and wherein the controller deactuates the switch if the voltage across the capacitor is less than the second threshold voltage.

2. The apparatus of claim 1, wherein the controller further comprises:
   a second comparator that is coupled to the capacitor and that receive the first threshold;
   a third comparator that is coupled to the capacitor and that receives the second threshold; and
   a flip-flop that is coupled to the first comparator and to the second comparator, wherein the output of the flip-flop actuates and deactuates the switch.

3. The apparatus of claim 2, wherein the flip-flop is an RS-type flip-flop.

4. The apparatus of claim 1, wherein the controller further comprises a buffer that is coupled to the capacitor.

5. The apparatus of claim 1, wherein the apparatus further comprises:
   a voltage source; and
   a resistor coupled between the voltage source and the capacitor.

6. The apparatus of claim 1, wherein the apparatus further comprises a diode coupled between first current source and the capacitor.

7. A method comprising:
   charging a capacitor;
   outputting a reference voltage from a multiplexer if the voltage across the capacitor is less than a first threshold voltage;
   outputting the voltage across the capacitor from the multiplexer if the voltage across the capacitor is greater that the reference voltage;
   if the voltage across the capacitor is greater than the first threshold voltage, discharging the capacitor until the voltage across the capacitor is less than a second threshold voltage; and
   if the voltage across the capacitor is less than the second threshold voltage, charging the capacitor until the voltage across the capacitor is greater than the first threshold voltage.

8. The method of claim 7, wherein the step of outputting the reference voltage from a multiplexer if the voltage across the capacitor is less than the first threshold voltage further comprises:
   comparing the voltage across the capacitor to the reference voltage by a comparator; and
   applying an output of the comparator to a select input of the multiplexer.

9. The method of claim 7, wherein the step of discharging the capacitor until the voltage across the capacitor is less than a second threshold voltage further comprises:
   comparing the voltage across the capacitor to the first threshold voltage by a comparator; and
   applying an output of the comparator to an S-input of an RS-type flip-flop.

10. The method of claim 7, wherein the step of charging the capacitor until the voltage across the capacitor is greater than the first threshold voltage further comprises:
    comparing the voltage across the capacitor to the second threshold voltage by a comparator; and
    applying an output of the comparator to an R-input of an RS-type flip-flop.

11. The apparatus of claim 7, wherein the method further comprises applying the voltage across the capacitor to a buffer.

12. An apparatus comprising:
    means for charging a capacitor;
    means for outputting a reference voltage if the voltage across the capacitor is less than a first threshold voltage;
    means for outputting the voltage across the capacitor if the voltage across the capacitor is greater that the reference voltage;
    means for discharging the capacitor until the voltage across the capacitor is less than a second threshold voltage if the voltage across the capacitor is greater than the first threshold voltage; and
    means for charging the capacitor until the voltage across the capacitor is greater than the first threshold voltage if the voltage across the capacitor is less than the second threshold voltage.

13. The apparatus of claim 12, wherein the means for outputting the reference voltage if the voltage across the capacitor is less than the first threshold voltage further comprises:
    means for comparing the voltage across the capacitor to the reference voltage; and
    means for selecting the reference voltage.

14. The method of claim 12, wherein the means for discharging the capacitor until the voltage across the capacitor is less than the second threshold voltage further comprises:
  means for comparing the voltage across the capacitor to the first threshold voltage; and
  means for applying signal to an S-input of an RS-type flip-flop.

15. The method of claim 12, wherein the means for charging the capacitor until the voltage across the capacitor is greater than the first threshold voltage further comprises:
  means for comparing the voltage across the capacitor to the second threshold voltage; and
  means for applying an signal to an R-input of an RS-type flip-flop.

16. The apparatus of claim 12, wherein the apparatus further comprises means for buffering the voltage across the capacitor.

* * * * *